May 26, 1931. F. J. MAURO 1,807,246
WEATHERPROOF LICENSE PLATE HOLDER FOR MOTOR VEHICLES
Filed Feb. 17, 1930
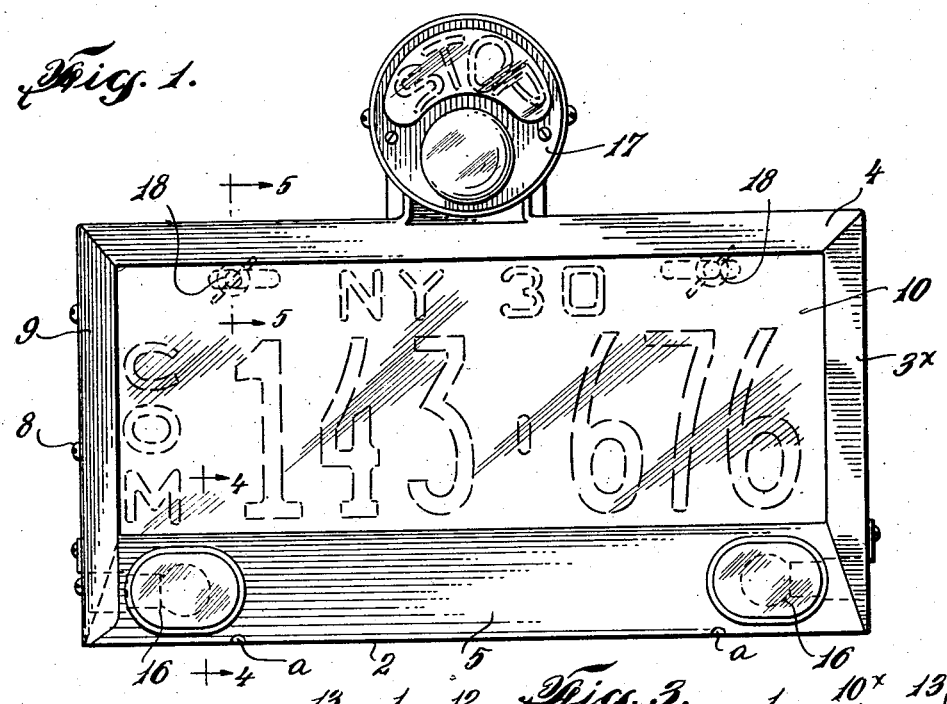
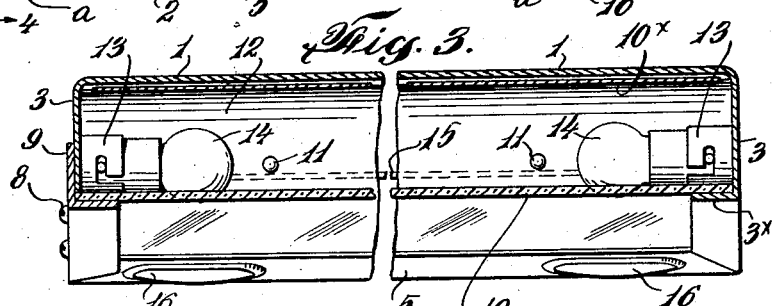
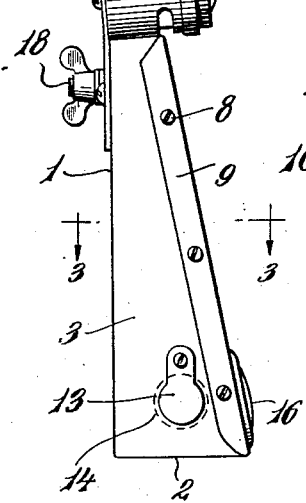
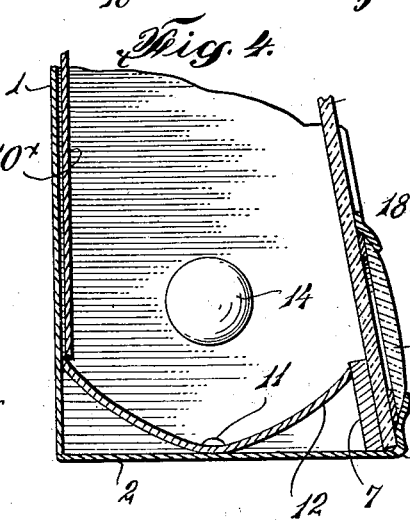
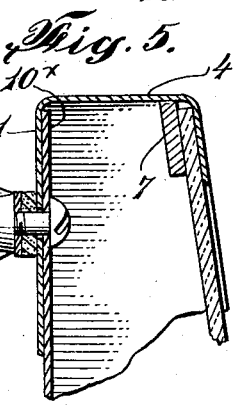
INVENTOR
Frank J. Mauro
BY W. Lee Helms
ATTORNEY Patented May 26, 1931

1,807,246

UNITED STATES PATENT OFFICE

FRANK J. MAURO, OF BROOKLYN, NEW YORK

WEATHERPROOF LICENSE PLATE HOLDER FOR MOTOR VEHICLES

Application filed February 17, 1930. Serial No. 428,984.

The object of the present invention is to provide a weatherproof license plate holder so constructed that it may be inexpensive, light in weight and enable removal and replacement of license plates with the minimum effort and provide uniform illumination of the plate. The further object of the invention is to provide such a license plate holder which shall be rain-proof, without the necessity of employing packing or tight connections between the transparent front plate and the surrounding frame.

The invention will be described with reference to the accompanying drawings, in which Fig. 1 is a front elevation of an embodiment of the invention.

Fig. 2 is a side elevation of the device.

Fig. 3 is a horizontal section on the line 3—3, Fig. 2.

Fig. 4 is a fragmentary vertical section on the line 4—4, Fig. 1.

Fig. 5 is a fragmentary vertical section on line 5—5, Fig. 1.

Referring to the drawings, it will be noted that the main body of the holder is constructed of a single sheet of material, bent to form a back plate 1, a horizontal base 2, side plates or wings 3, side flange $3x$, top flange 4, and bottom flange 5. Rearwardly of the top and bottom flanges 4 and 5, may be welded lips or back flanges 7. Secured to the left hand side plate 3 by screws 8 is an angle plate 9, which serves to hold a transparent window 10 back to the flanges $3x$, 4 and 5, and against the lips 7. By removing angle plate 9, the transparent window 10 may be slid to the right and likewise may be readily removed.

Secured to bottom plate 2 as by rivets 11, is a curved reflector 12, and adjacent the reflector, preferably carried by the side plates 3 are sockets 13, for electric lamps 14, wiring for the sockets being indicated at 15.

The front flange 5 may, when the device is maintained for the rear of a motor vehicle, have formed therein apertures for receiving red reflector glass as indicated at 16, to receive and reflect back the light rays of an approaching motor vehicle. When the device is employed at the rear of a motor vehicle, the top thereof may support a warning lamp indicated at 17, and the base of the lamp may communicate with an aperture formed in the top wall of the license plate holder, so that the rays from the lamp may pass down within the holder and aid in illuminating the license plate.

The license plate shown at $10x$ may be secured to the back wall 1 by threaded bolts 18, and these bolts may extend outwardly from plate 1 so as to enable their passage through slots in the usual license plate holder bracket on the motor vehicle, to be held thereon by wing nuts in the customary manner; in other words, in placing the device on a motor vehicle the opposed wing nuts, of which one is shown in Fig. 2, are removed, the bolts 18 are passed through the slots in the customary license plate holder bracket, whereupon, wing nuts are restored to the bolts to clamp the device firmly in position.

It will be noted that the holder comprises as to its primary member, a single sheet of material bent to form a back, top, base, side wings and three front flanges. At the base of the lowermost flange, the latter is provided with holes, and the transparent window 10, which may be of celluloid, is rearwardly inclined and held against the lips 7. Thus, when rain falls upon transparent window 10 it will pass downwardly in front of the lower lip 7 and through the apertures rearwardly of the lower lip 7, the apertures being indicated at $a$. The removable angle plate 9 provides an ideal means for removal and insertion of the transparent window so that ready access to the license plate may be secured.

Having described my invention, what I claim and desire to secure by Letters Patent is as follows:

A weatherproof license plate holder comprising a metal sheet bent to form a back, a top, a flange depending from the top, a base, a flange upwardly projecting from the base and of substantially greater width than said top depending flange, and side wings having rearwardly inclined front edges, a flange extending inwardly from one of the side wings, lips carried by the top and bottom plates, and spaced parallel with and adjacent to said flanges, a transparent window adapted to be held against said lips by the flanges of the top and bottom plates and said side wing, means for securing the license plate to the back, including a bolt projecting through the back, a corner member adapted to be secured to the other side wing and to lie over upon the transparent window when the latter is in place so as to secure the same in position, lamps carried by the side wings within the holder and near the base thereof and opposed transparent windows in the flange of the base member, said windows being disposed substantially opposite said lamps.

In testimony whereof, I have hereunto signed my name to this specification.

FRANK J. MAURO.